United States Patent
Karampatsis et al.

(10) Patent No.: US 11,246,072 B2
(45) Date of Patent: Feb. 8, 2022

(54) SWITCHING COMMUNICATION MODES (DIRECT AND INDIRECT UE ACCESS)

(71) Applicants: Motorola Mobility LLC, Chicago, IL (US); Dimitrios Karampatsis, Ruislip (GB); Apostolis Salkintzis, Athens (GR)

(72) Inventors: Dimitrios Karampatsis, Ruislip (GB); Apostolis Salkintzis, Athens (GR)

(73) Assignee: Motorola Mobility LLC, Chicago, IL (US)

( * ) Notice: Subject to any disclaimer, the term of this patent is extended or adjusted under 35 U.S.C. 154(b) by 36 days.

(21) Appl. No.: 16/491,362

(22) PCT Filed: Jun. 6, 2017

(86) PCT No.: PCT/EP2017/063702
§ 371 (c)(1),
(2) Date: Sep. 5, 2019

(87) PCT Pub. No.: WO2018/224128
PCT Pub. Date: Dec. 13, 2018

(65) Prior Publication Data
US 2020/0037218 A1 Jan. 30, 2020

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0058* (2018.08); *H04W 36/0085* (2018.08); *H04W 36/16* (2013.01); *H04W 88/04* (2013.01)

(58) Field of Classification Search
None
See application file for complete search history.

(56) References Cited

U.S. PATENT DOCUMENTS

| 6,490,452 B1 | 12/2002 | Boscovic et al. |
| 2004/0058678 A1 | 3/2004 | deTorbal |

(Continued)

FOREIGN PATENT DOCUMENTS

| WO | 2013023171 A1 | 2/2013 |
| WO | 2015/0074142 A1 | 1/2015 |

OTHER PUBLICATIONS

3GPP TR 36.746 D2D UE to network relays for IoT and wearables V1.0.0 May 29, 2017. Downloadable from http://3gpp.org/DynaReport/36-series.htm (Year: 2017).*

(Continued)

*Primary Examiner* — Jeffrey M Rutkowski
*Assistant Examiner* — Basil Ma
(74) *Attorney, Agent, or Firm* — Kunzler Bean & Adamson

(57) ABSTRACT

Apparatuses, methods, and systems are disclosed for switching a communication mode of a remote UE. One apparatus includes a processor (405) and a radio transceiver (425) that communicates with a relay unit (120). Here, the processor (405) decides to handover the relay unit (120) and determines a group of one or more remote units (105) associated with the relay unit (120), wherein the relay unit (120) is a relay for the group. The processor (405) selects a target base unit (110) of a mobile communication network based on the relay unit (120) and the group of one or more remote units (105) and determines a first subgroup of remote units (105) from among the group of one or more remote units (105) that cannot be supported by the target base unit (110). The processor (405) also sends, to a remote unit (105) in the first subgroup of remote units (105), a command to resume communication with the mobile communication network without using the relay unit (120).

20 Claims, 8 Drawing Sheets

(51) Int. Cl.
*H04W 36/16* (2009.01)
*H04W 88/04* (2009.01)

(56) References Cited

U.S. PATENT DOCUMENTS

| | | | |
|---|---|---|---|
| 2011/0194483 A1 | 8/2011 | Ji et al. | |
| 2013/0183971 A1* | 7/2013 | Tamaki | H04W 36/0061 |
| | | | 455/436 |
| 2013/0324114 A1 | 12/2013 | Raghothaman et al. | |
| 2018/0152986 A1* | 5/2018 | Jung | H04W 76/27 |
| 2018/0234919 A1* | 8/2018 | Tsuda | H04W 52/0216 |
| 2020/0092685 A1* | 3/2020 | Fehrenbach | H04B 7/2606 |

OTHER PUBLICATIONS

Lenovo, Motorola Mobility, "Handover of eRelay-UE with eRemote-UE(s) having an active indirect connection", SA WG2 Meeting #122 S2-1744969, Jun. 26-30, 2017, pp. 1-6.
PCT/EP2017/063702, "Notification of Transmittal of the International Search Report and the Written Opinion of the International Searching Authority, or the Declaration", PCT, dated Oct. 13, 2017, pp. 1-17.
3GPP, "3rd Generation Partnership Project; Technical Specification Group Services and System Aspects; Study on Architecture Enhancements to ProSe UE-to-Network Relay (Release 15)", 3GPP TR 23.733 V1.0.0, Jun. 2017, pp. 1-53.
Itri, "Update to Key issue 5 on Service continuity for group handover", SA WG2 Meeting #121 S2-173519, May 15-19, 2017, pp. 1-2.
3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 15)", 3GPP TS 23.401 V15.8.0, Jun. 2019, pp. 1-411.
3GPP, "3rd Generation Partnership Project; Technical Specification Group Services and System Aspects; Proximity-based services (ProSe); Stage 2 (Release 15)", 3GPP TS 23.303 V15.1.0, Jun. 2018, pp. 1-130.
3GPP, "3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746 V15.1.1, Mar. 2018, pp. 1-55.

* cited by examiner

SWITCHING COMMUNICATION MODES (DIRECT AND INDIRECT UE ACCESS)

FIELD

The subject matter disclosed herein relates generally to wireless communications and more particularly relates to enabling a remote UE to switch from indirect communication mode to direct communication mode while maintaining service continuity.

BACKGROUND

The following abbreviations and acronyms are herewith defined, at least some of which are referred to within the following description.

Third Generation Partnership Project ("3GPP"), Positive-Acknowledgment ("ACK"), Binary Phase Shift Keying ("BPSK"), Carrier Aggregation ("CA"), Clear Channel Assessment ("CCA"), Control Channel Element ("CCE"), Channel State Information ("CSI"), Common Search Space ("CSS"), Discrete Fourier Transform Spread ("DFT-S"), Downlink Control Information ("DCI"), Discrete Fourier Transform Spread OFDM ("DFT-S-OFDM"), Downlink ("DL"), Downlink Pilot Time Slot ("DwPTS"), Enhanced Clear Channel Assessment ("eCCA"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTA Advanced ("LTE-A"), Medium Access Control ("MAC"), Multiple Access ("MA"), Modulation Coding Scheme ("MCS"), Mobility Management Entity ("MME"), Machine Type Communication ("MTC"), Massive MTC ("mMTC"), Multiple Input Multiple Output ("MIMO"), Multipath TCP ("MPTCP"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Packet Data Convergence Protocol ("PDCP"), Packet Data Network ("PDN"), PDN Gateway ("P-GW"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Serving Gateway ("S-GW"), Sparse Code Multiple Access ("SCMA"), Switching/Splitting Function ("SSF"), Scheduling Request ("SR"), Sounding Reference Signal ("SRS"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Transmission Control Protocol ("TCP"), Time-Division Duplex ("TDD"), Time Division Multiplex ("TDM"), Transmission and Reception Point ("TRP"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Uplink Pilot Time Slot ("UpPTS"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In mobile communication networks, a remote UE may operate in an indirect communication mode where the remote UE accesses mobile network communication services via the relay UE. If the relay UE hands over to a target eNB that cannot support the remote UE, then the remote UE will become disconnected from the mobile network.

BRIEF SUMMARY

Methods for enabling a remote UE to switch from indirect communication mode, where the remote UE accesses mobile network communication services via the Relay UE, to direct communication mode, where the remote UE interfaces directly to the mobile network, while maintaining service continuity are disclosed. Apparatuses and systems also perform the functions of the methods. One method for enabling a remote UE to switch from indirect communication mode to direct communication mode while maintaining service continuity includes serving a relay unit in a mobile communication network and determining to handover the relay unit. The method includes determining a group of one or more remote units associated with the relay unit, wherein the relay unit is a relay for the group and selecting a target base unit of a mobile communication network based on the relay unit and the group of one or more remote units. Here, the method further includes determining a first subgroup of remote units from the among group of one or more remote units that cannot be supported by the target base unit and sending, to a remote unit in the first subgroup of remote units, a command to resume communication with the mobile communication network without using the relay unit.

One system for enabling a remote UE to switch from indirect communication mode to direct communication mode while maintaining service continuity includes a first base unit, a relay unit that accesses a mobile communication network through a data path that includes the first base unit, and a remote unit that accesses the mobile communication network through a first data path that includes the relay unit and the first base unit. The remote unit transmits a request to switch to a second data path with the mobile communication network that does not include the relay unit and receives a measurement report request from the first base unit via the first data path in response to the request to switch to the second data path. The remote unit also receives a command from the first base unit via the first data path to switch to the second data path that includes a second base unit. The first base unit determines to switch the remote unit from the first data path to the second data path in response to the remote unit transmitting a measurement report and switches the remote unit from the first data path to the second data path without changing the data path of the relay unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
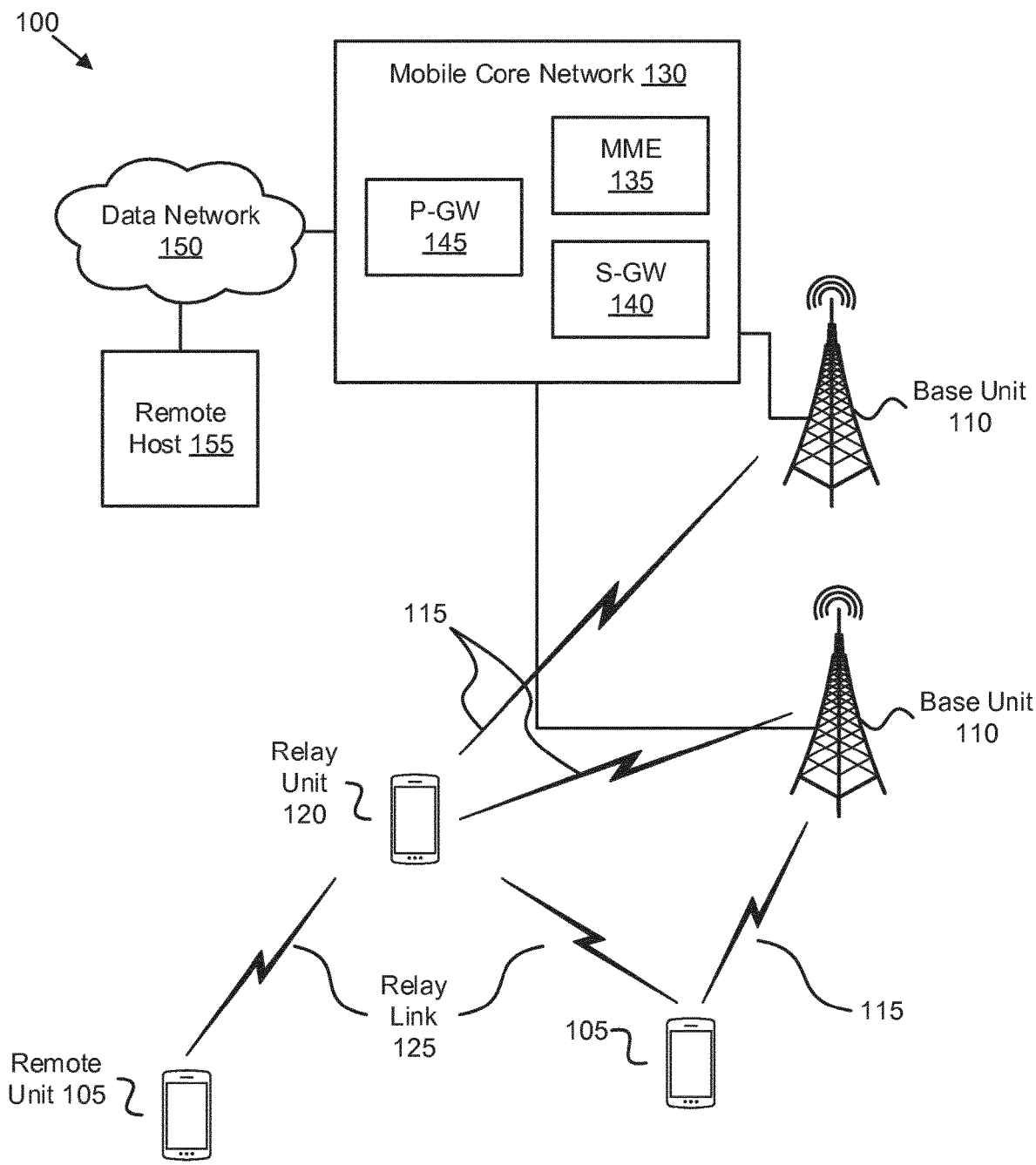
FIG. 1 is a schematic block diagram illustrating one embodiment of a wireless communication system for enabling a remote UE to switch from indirect communication mode to direct communication mode while maintaining service continuity.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

In order to maintain service continuity of a remote UE when its relay UE to be handed over to a first target base unit that does not support the remote UE, a source eNB in the mobile communication network instructs the remote UE to switch from indirect communication mode (e.g., where the remote UE accesses mobile network communication communication services via the relay UE) to direct communication mode (e.g., communication without the relay UE where the remote UE interfaces directly to the mobile network). In certain embodiments, the source eNB hands over the remote UE to second target eNB in the mobile communication network. Additionally, the remote UE may itself decide to switch communication modes.

FIG. 1 depicts a wireless communication system 100 for enabling a remote UE to switch from indirect communication mode to direct communication mode while maintaining service continuity, according to embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the LTE system specified in the 3GPP specifications. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

The base units 110 may be distributed over a geographic region. In certain embodiments, a base unit 110 may also be referred to as an access terminal, a base, a base station, a Node-B, an eNB, a gNB, a Home Node-B, a relay node, a femtocell, an access point, a device, or by any other terminology used in the art. The base units 110 are generally part of a radio access network ("RAN") that may include one or more controllers communicably coupled to one or more corresponding base units 110. These and other elements of radio access network are not illustrated but are well known generally by those having ordinary skill in the art. The base units 110 connect to the mobile core network 130 via the RAN.

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

The wireless communication system 100 includes one or more relay units 120 capable of relaying traffic of the remote units 105 to the base units 110. The relay units 120 are remote units 105 capable of relaying the traffic. As such, a relay unit maintains its own network connections. In one embodiment, a relay unit may 120 communicate with a remote host 155 via a network connection with a base unit 110 and the mobile core network 130. The remote units 105 and relay units 120 communicate using relay links 125. In one embodiment, the relay links 125 may be any suitable carrier in licensed or unlicensed radio spectrum. Examples of relay links 125 include, but are not limited to LTE-direct links, WiFi-direct links, and the like.

In one embodiment, the mobile core network 130 is an evolved packet core ("EPC"), which may be coupled to a data network 150, like the Internet and private data networks, among other data networks. In some embodiments, the remote units 105 and/or relay units 120 communicate with a remote host 155 via a network connection with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network elements. As depicted, the mobile core network 130 includes at least one MME 135, at least one S-GW 140, and at least one P-GW 145. Although a specific number of MMEs 135, S-GWs 140, and P-GWs 145 are depicted in FIG. 1, one of skill in the art will recognize that any number of MMEs 135, S-GWs 140, and P-GWs 145 may be included in the mobile core network 130.

The MME 135 is a control plane network element that handles signaling related to mobility and security for the remote unit 105. The MME 135 is a termination point for a NAS connection of the remote unit 105 to the mobile core network 130. The S-GW 140 is a user plane element that connects the RAN to the mobile core network 130. The S-GW 140 serves the remote unit 105 by routing incoming/outgoing IP packets. The P-GW 145 is a user plane element that connects the mobile core network 130 to an external (IP) network, such as the data network 150. Although logically separate elements, in some As depicted, a relay unit 120 may provide a remote unit 105 with access to a base unit 110. However, the relay unit 120 may be a mobile device and may require handover to a target base unit 110 due to movement of the relay unit 120. To prevent a remote unit 105 using the relay unit 120 from becoming disconnected if the target base unit 110 cannot support the remote unit 105, a source base unit 110 may instruct the remote unit 105 to switch to a direct communication mode, as discussed in greater detail below.

Figure 2A:
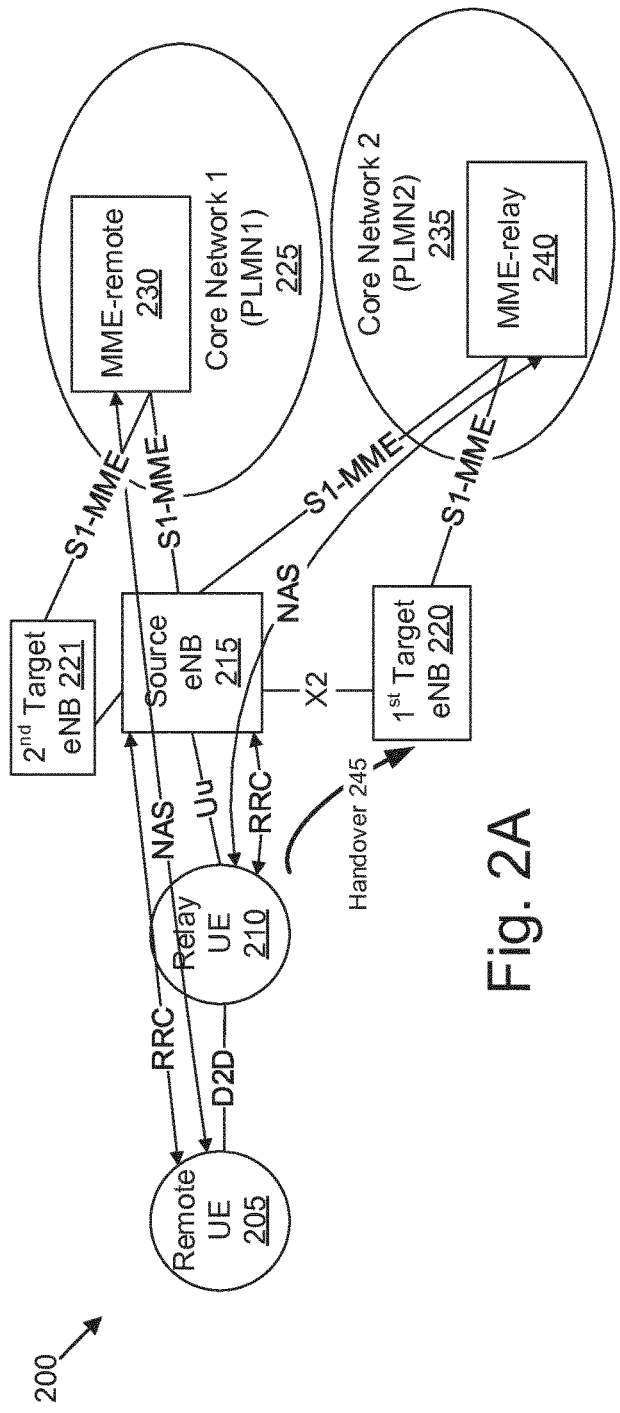
FIG. 2 is a block diagram illustrating one embodiment of a network architecture for enabling a remote UE to switch from indirect communication mode to direct communication mode while maintaining service continuity.

FIG. 2A depicts a network architecture 200 used for enabling a remote UE to switch from indirect communication mode to direct communication mode while maintaining service continuity, according to embodiments of the disclosure. The network architecture 200 may be a simplified embodiment of the wireless communication system 100. As depicted, the network architecture 200 includes a remote UE 205, a relay UE 210, a source eNB 215, a first target eNB 220, second target eNB 221, a first core network 225, an MME-remote 230, a second core network 235, and an MME-relay 240. In one embodiment, the first core network 225 belongs to a first PLMN, while the second core network 235 belongs to a second PLMN.

The remote UE 205 may be one embodiment of the remote unit 105. The relay UE 210 may be one embodiment of a remote unit 105 acting as a relay unit 120. Here, the remote UE 205 and the relay UE 210 have a device-to-device ("D2D") connection. The remote UE 205 has its own subscription with the mobile network and, when accessing the mobile network via a relay UE 210, it utilizes its own subscription credentials. The relay UE 210 functions as a "layer-2" relay for the remote UE 205. Also, the remote UE 205 communicates with the mobile network (e.g., source eNB 215 and first core network 225) by using its own NAS signaling connection and RRC signaling connection with both connections going through the relay UE 210. While only one remote UE 205 is depicted, in other embodiments multiple remote UEs 205 may be associated with the relay UE 210 (e.g., use the relay UE 210 as a L2 relay to the mobile network).

As depicted, the remote UE 205 has a NAS connection with the MME-remote 230 located in the first core network 225. Here, the data path of the remote UE 205's NAS connection includes the relay UE 210 and the source eNB 215. Also as depicted, the relay UE 210 has a separate RRC connection with the source eNB 215 and a NAS connection with the MME-relay 240 located in the second core network separate from the NAS connection of the remote UE 205.

The source eNB 215, first target eNB 220, and second target eNB 221 may be embodiments of the base unit 110, discussed above. The first core network 225 and second core network 235 may be embodiments of the mobile core network 130, discussed above. Further, each of the MME-remote 230 and MME-relay 240 may be an embodiment of the MME 135.

As depicted in FIG. 2A, the source eNB 215 initially serves the relay UE 210 (and, by extension, the remote UE 205). Here, the source eNB 215 has a connection to the relay UE 210 (e.g., using a "Uu" interface), a connection to the MME-remote 230 (e.g., using a "S1-MME" interface), and a connection to the MME-relay 240 (e.g., also using a "S1-MME" interface). At some point, the source eNB 215 determines to handover 245 the relay UE 210 (e.g., due to movement of the relay UE 210). Here, the first target eNB 220 is selected as the handover target for the relay UE 210. Target selection is discussed in further detail, below. Note that the first target eNB 220 and second target eNB 221 each have "S1-MME" connections to the MME-relay 240 and MME-remote 230, respectively. Additionally, the first target eNB 220 and second target eNB 221 communicate with each other (and other eNBs) using an "X2" interface.

The relay UE 210 differs from a traditional relay node is that it also operates as a normal UE that attaches to the mobile network and establishes its own RRC and NAS connections. As shown in FIG. 2A, both the remote UE 205 and the relay UE 210 have separate RRC connections and NAS connections with the mobile network. In certain embodiments, the MME selected to serve the remote UE 205 (here, the MME-remote 230) may be different from the MME selected to serve the relay UE 210 (here, the MME-relay 240). This is because the MME is selected based on subscription information and other criteria which may be different for the remote UE 205 and relay UE 210.

In many scenarios, the relay UE 210 may be a mobile device and therefore it may need to handover between different base units as it moves within the network's coverage area. In some embodiments, when the relay UE 210 hands over to a new eNB (e.g., the first target eNB 220), all the remote UEs 205 connected to this relay UE 210 will also be handed over to the new eNB without themselves being involved in a handover procedure. However, in certain embodiments the new eNB cannot serve one or more of the remote UEs 205. As discussed in greater detail below, the source eNB 215 identifies those remote UEs 205 that cannot be served by the new eNB (e.g., the first target eNB 215) and instructs the identified remote UEs 205 to connect directly to the mobile network (e.g., without using the relay UE 210).

Figure 2B:
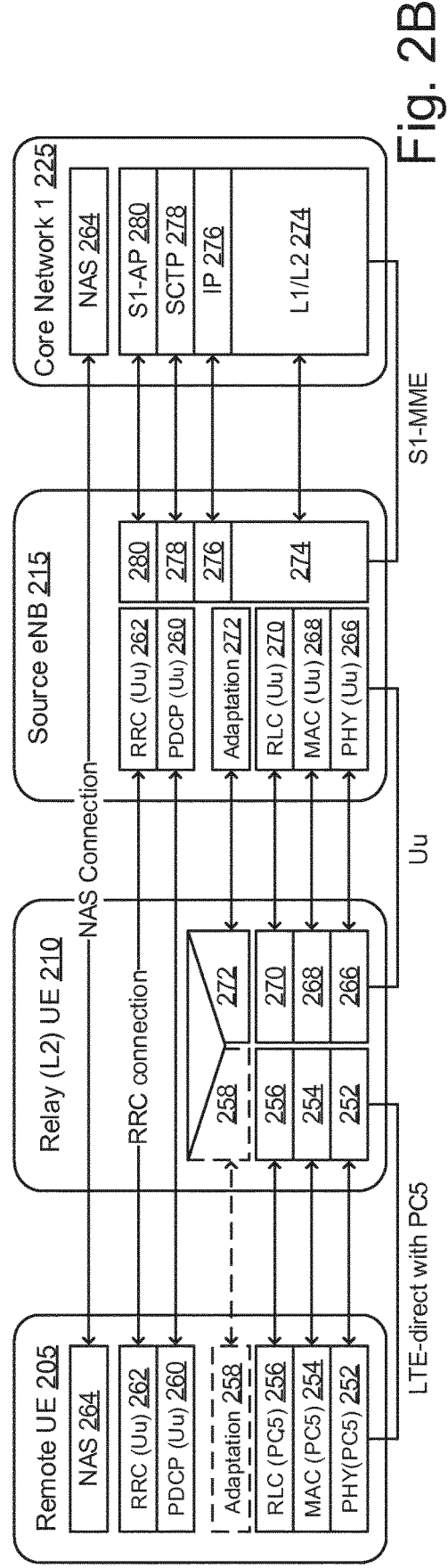

FIG. 2B depicts a protocol stack 250 used in the network architecture 200. Specifically, FIG. 2B shows the protocol stack 250 used by the remote UE 205, relay UE 210, source eNB 215, and first core network 225. As discussed above, the remote UE 205 and relay UE 210 communicate using D2D technology, for example using an LTE-direct connection and PC5 signaling. While and LTE-direct/PC5 connection is shown in FIG. 2B, in other embodiments other D2D connection types may be employed between the remote UE 205 and the relay UE 210 that allow the relay UE 210 to act as an L2 relay, thereby rendering the remote UE 205 visible to the first core network 225. Note that the remote UE 205 is visible to the mobile network (e.g., the source eNB 215 and the first core network 225) due to having RRC and NAS connections separate from those of the relay UE 210.

As depicted, the remote UE 205 has a PC5 physical layer 252 (depicted "PHY (PC5)"), a PC5 MAC layer 254 (depicted as "MAC (PC5)"), and a PC5 RLC layer 256 (depicted as "RLC (PC5)"). The relay UE 210 has corresponding layers used to communicate with the remote UE 205 (e.g., using PC5). In certain embodiments, the remote UE 205 and relay UE 210 have an optional adaptation layer 258. The adaptation layer is a new layer that enables the remote UE 205 to communicate with the mobile network (e.g., source eNB 215 and first core network 225) via the relay UE 210. Here, the source eNB 215 and relay UE 210 use information included in the adaptation layer 258 to identify radio bearers of the remote UE 205 and to determine how such radio bearers are mapped to the relay UE 210's DRBs over the Uu radio interface.

Additionally, the relay UE 210 and source eNB 215 each have a Uu physical layer 266 (depicted "PHY (Uu)"), a Uu MAC layer 268 (depicted as "MAC (Uu)"), and a Uu RLC layer 270 (depicted as "RLC (Uu)"), and an adaptation layer 272. The relay UE 210 translates the PC5 layers to Uu layers and vice versa to relay communication between the remote UE 205 and the source eNB 215. The remote UE 205 has a Uu PDCP layer 260 and a Uu RRC layer 262. The source eNB 215 has corresponding Uu PDCP and Uu RRC layers 260, 262 that establish a RRC connection between the remote UE 205 and the source eNB 215. Note that the remote UE 205 and the relay UE 210 have separate RRC connections with the source eNB 215.

The source eNB 215 has a S1-MME connection to the first core network 225. The source eNB 215 has a L1/L2 layer 274, an IP layer 276, a stream control transmission protocol ("SCTP") layer 278, and a S1-AP layer 280. Corresponding layers at the first core network 225 terminate L1/L2, IP, SCTP, and S1-AP connections.

In addition, the remote UE 205 and first core network 225 each have a NAS layer 264 that establishes a NAS connection between the remote UE 205 and first core network 225. As depicted, the remote UE 205 has an RRC connection with the source eNB 215 and a NAS connection with the first core network. Note that both connections go through the relay UE 210, which operates as a layer-2 ("L2") relay. As such, the relay UE 210 relays PDCP packet data units (PDUs) between the remote UE 205 and the source eNB 215. Note that the relay UE 210 has a separate NAS connection (e.g., with the second core network 235).

When the source eNB 215 decides to handover the relay UE 210 and determines that a selected target eNB cannot support the remote UE 205, the source eNB 215 instructs the remote UE 205 to transition to a direct communication mode wherein the remote UE 205 communicates directly with the mobile network and no longer uses the relay UE 210. In such a scenario, the protocol stack 250 is modified such that the relay UE 210 does not exist in the remote UE 205's data path to the mobile network (e.g., source eNB 215). When the remote UE 205 establishes a Uu connection to the mobile network (e.g., source eNB 215), the RLC (PC5) layer 256, MAC (PC5) layer 254, and PHY (PC5) layer 252 in the remote UE 205 will be replaced with a RLC (Uu) layer 270, MAC (Uu) layer 268, and PHY (Uu) layer 266. Additionally, the remote UE 205 and mobile network (e.g., source eNB 215) will no longer require the adaptation layers 258, 272.

Figure 3:
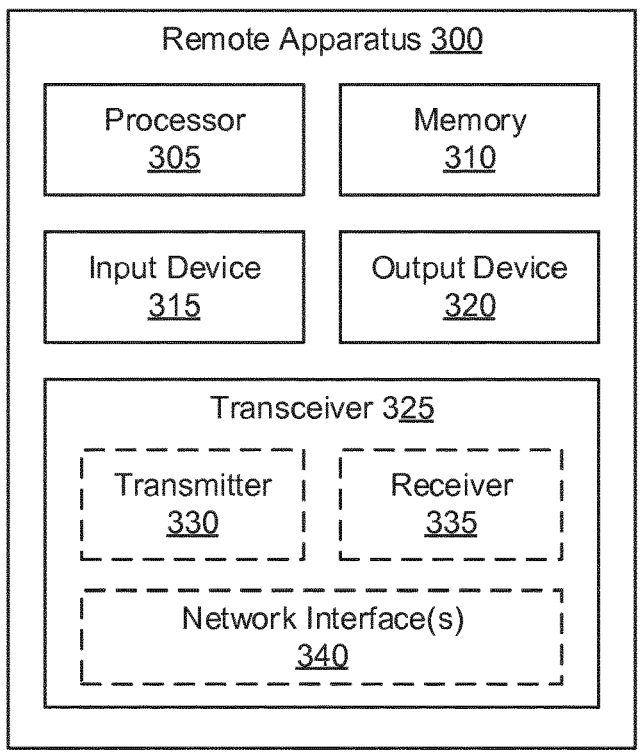
FIG. 3 is a schematic block diagram illustrating one embodiment of a remote apparatus for enabling a remote UE to switch from indirect communication mode to direct communication mode while maintaining service continuity.

FIG. 3 depicts one embodiment of a remote apparatus 300 that may be used for enabling a remote UE to switch from indirect communication mode to direct communication mode while maintaining service continuity, according to embodiments of the disclosure. The remote apparatus 300 may be one embodiment of the remote unit 105, the relay unit 120, the remote UE 205, and/or the relay UE 210. Furthermore, the remote apparatus 300 includes a processor 305, a memory 310, an input device 315, a display 320, and a transceiver 325.

The transceiver 325 communicates with a mobile communication network (e.g., a core network) over an access network (e.g., the base unit 110 and/or source/target eNBs 215, 220). In one embodiment, the remote apparatus 300 communicates directly with the access network. In another embodiment, the remote apparatus 300 communicates with the access network via a relay UE, such as the relay unit 120. Here, the transceiver 325 employs a D2D connection to the relay UE, as discussed above.

The transceiver 325 may include at least one transmitter 330 and at least one receiver 335. Additionally, the transceiver 325 may support at least one network interface 340 such as a "PC5" interface used to communicate with a relay UE and/or "Uu" interface used to communicate with a base unit or eNB. In some embodiments, the input device 315 and the display 320 are combined into a single device, such as a touchscreen. In certain embodiments, the remote unit 105 may not include any input device 315 and/or display 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the display 320, and the transceiver 325.

In some embodiments, the processor 305 controls the transceiver 325 to access a mobile communication network through a first data path that includes a relay UE (e.g., a relay unit 120 and/or a relay UE 210) as well as a first base unit (e.g., a base unit 110 and/or the source eNB 215). In certain embodiments, the relay UE is a L2 relay for the remote apparatus 300, wherein the processor 305 establishes a first RRC connection and a first NAS connection with the mobile communication network that are separate from a second RRC connection and a second NAS connection belonging to the relay UE.

At some point in time, the processor 305 transmits (e.g., controls the transceiver 325 to transmit) a request to switch to a second data path with the mobile communication network that does not include the relay UE. For example, the processor 305 may transmit the request to switch to the second data path in response to determining that the remote apparatus 300 is within radio coverage of the mobile communication network and/or in response to detecting a deteriorated connection to the relay UE. In some embodiments, the remote apparatus 300 only communicates with the mobile communication network via the relay UE when in the indirect communication mode. In such embodiments, the request to switch to the second data path is a request to switch from an indirect communication mode to a direct communication mode.

In response to the request to switch to the second data path, the processor 305 may receive (e.g., via the first data path) a request from the first base unit to provide a measurement report. In certain embodiments, the first base unit determines to switch the remote apparatus 300 from the first data path to the second data path in response to the processor 305 generating and transmitting the measurement report. In such embodiments, the processor 305 receives a command from the first base unit via the first data path to switch to the second data path that includes a second base unit, wherein the first base unit switches the remote apparatus 300 from the first data path to the second data path without changing the data path of the relay UE.

In one embodiment, switching the remote apparatus 300 from the first data path to the second data path includes maintaining an active data connection while switching from the first data path to the second data path. In another embodiment, switching the remote apparatus 300 from the first data path to the second data path without changing the data path of the relay UE comprises maintaining an active mobility management connection while switching from the first data path to the second data path.

In certain embodiments, the processor 305 may receive a request from the first base unit to provide a measurement report in response to the relay UE sending a request to switch the data path of the remote apparatus 300. Here, the processor 305 generates and transmits the requested measurement report to the first base unit. In response, the processor 305 may receive a command from the first base unit (via the first data path) to switch to a second data path that includes another base unit (e.g., different than the first base unit).

In certain embodiments, the processor 305 may transition the remote apparatus 300 into an idle mode (e.g., an RRC Idle state) wherein the first base unit hands over the relay UE to a first target base unit while the remote apparatus 300 remains in the idle mode, where the remote apparatus 300 is restricted from using the first target base unit. Here, the processor 305 may transmit an RRC initial message to the first target base unit via the relay UE upon transitioning out of the idle mode (e.g., while attempting to transition to an RRC connected state). However, instead of the first target base unit rejecting the RRC connection (as typically occurs when a base unit determines that a remote unit is restricted from using it), instead the processor 305 receives a handover command from the target base unit in response to the RRC initial message. Here, the handover command instructs the processor 305 to resume communication with the mobile communication network by using a second target base unit and without using the relay UE.

In some embodiments, the processor 305 receives a command from the first base unit to resume communication with the mobile communication network without using the relay UE. In such embodiments, the processor 305 may also receive a measurement report request from the first base unit. Because the remote apparatus 300 has an indirect connection to the RAN (e.g., connected via the relay UE), the command to resume communication without using the relay UE is a command for the processor 305 to transition from an indirect communication mode (e.g., communicating via the relay UE) to a direct communication mode (e.g., communicating directly with the RAN).

Where requested, the processor 305 may generate and transmit a measurement report to the first base unit. In certain embodiments, the processor 305 receives the command to resume communication with the mobile communication network without using the relay UE in response to sending the measurement report. In some embodiments, the command to resume communication with the mobile communication network without using the relay UE indicates a second base unit in the mobile communication network with which the processor 305 is to establish a connection. In one embodiment, the command to resume communication without using the relay UE is an RRC message instructing the processor to resume communication with the determined second base unit.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to enabling a remote UE to switch from indirect communication mode to direct communication mode while maintaining service continuity, for example storing radio channel measurements, protocol stacks, messages, and the like. In some embodiments, the memory 310 also stores program code and related data, such as an operating system or other controller algorithms operating on the remote unit 105 and one or more software applications.

The input device 315, in one embodiment, may include any known computer input device including a touch panel, a button, a keyboard, a stylus, a microphone, or the like. In some embodiments, the input device 315 may be integrated with the display 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The display 320, in one embodiment, may include any known electronically controllable display or display device. The display 320 may be designed to output visual, audible, and/or haptic signals. In some embodiments, the display 320 includes an electronic display capable of outputting visual data to a user. For example, the display 320 may include, but is not limited to, an LCD display, an LED display, an OLED display, a projector, or similar display device capable of outputting images, text, or the like to a user. As another, non-limiting, example, the display 320 may include a wearable display such as a smart watch, smart glasses, a heads-up display, or the like. Further, the display 320 may be a component of a smart phone, a personal digital assistant, a television, a table computer, a notebook (laptop) computer, a personal computer, a vehicle dashboard, or the like.

In certain embodiments, the display 320 includes one or more speakers for producing sound. For example, the display 320 may produce an audible alert or notification (e.g., a beep or chime). In some embodiments, the display 320 includes one or more haptic devices for producing vibrations, motion, or other haptic feedback. In some embodiments, all or portions of the display 320 may be integrated with the input device 315. For example, the input device 315 and display 320 may form a touchscreen or similar touch-sensitive display. In other embodiments, the display 320 may be located near the input device 315.

The transceiver 325 communicates with a mobile communication network via an access network (e.g., a base unit 110, a source eNB 215, a first target eNB 220, and/or a second target eNB 221). In one embodiment, the transceiver 325 communicates directly with the access network. In another embodiment, the transceiver 325 communicates with the access network via a relay UE. The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages. The transceiver 325 may include one or more transmitters 330 and one or more receivers 335 for communicating over the first access network. As discussed above, the transceiver 325 may support one or more the network interfaces 340 for communicating with the mobile communication network (e.g., the base unit 110 and various network elements in the mobile core network 130).

Figure 4:
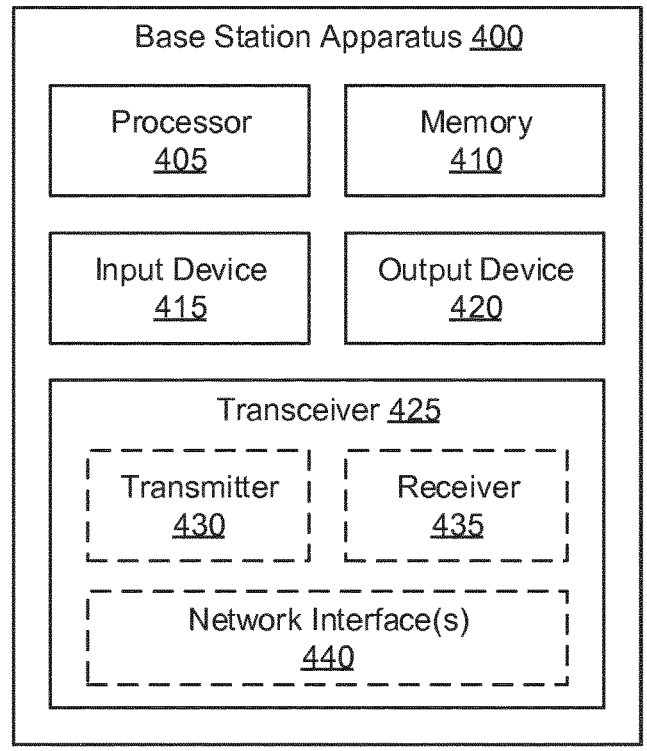
FIG. 4 is a schematic block diagram illustrating one embodiment of a base station apparatus for enabling a remote UE to switch from indirect communication mode to direct communication mode while maintaining service continuity.

FIG. 4 depicts one embodiment of a base stations apparatus 400 that may be used for enabling a remote UE to switch from indirect communication mode to direct communication mode while maintaining service continuity, according to embodiments of the disclosure. The base station apparatus 400 may be one embodiment of the base unit 110, the source eNB 215, the first target eNB 220 and/or the second target eNB 221. Furthermore, the base station apparatus 400 includes a processor 405, a memory 410, an input device 415, a display 420, and a transceiver 425. In some embodiments, the input device 415 and the display 420 are combined into a single device, such as a touchscreen. In certain embodiments, the base station apparatus 400 may not include any input device 415 and/or display 420.

As depicted, the transceiver 425 includes at least one transmitter 430 and at least one receiver 435. Additionally, the transceiver 425 may support at least one network interface 440 such as an "Uu" interface used to communicate with a UE, such as the remote unit 105, the relay unit 120, the relay UE 210, and/or the remote apparatus 300. Additionally, the at least one network interface 440 may include an "S1-MME" interface used to communicate with an MME (e.g., MME-remote 230 and/or MME-relay 240) in a core network.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the display 420, and the transceiver 425.

In some embodiments, the processor 405 decides to handover a relay UE, such as the relay unit 120. In response, the processor 405 determines a group of one or more remote UEs (e.g., remote units 105) associated with the relay UE such that the relay UE is a relay for the group. Additionally, the processor 405 selects a target base unit of a mobile communication network (e.g., the first target eNB 220) based on the relay UE and the group of one or more remote UE. In one embodiment, selecting the target base unit includes the processor 405 identifying a number of remote UEs a base unit can support and selecting a base unit supporting the largest number of remote UEs as the target base unit.

In some embodiments, not every remote UE in the group can be supported by the selected base unit. In such embodiments, the processor 405 determines a first subgroup of remote UEs from among the group of one or more remote UEs that cannot be supported by the target base unit. The first subgroup includes one or more remote UEs from the aforementioned group. In certain embodiments, the first subgroup consists of all remote UEs in the group. In other embodiments, the first subgroup consists of less than all the remote UEs in the group.

In certain embodiments, the group of remote UEs is divided into two subgroups: a first subgroup consisting of those remote UEs that cannot be supported by the target base unit and a second subgroup consisting of those remote UEs that can be supported by the target base unit. In other embodiments, the group of remote UEs may be divided into more than two subgroups. Also, the processor 405 is only aware of remote UEs in a connected state. Thus, the processor 405 is unaware if any remote UEs in an idle state still have an active D2D connection with the relay UE. As such, the group of one or more remote UEs may only include remote UEs in a connected state (e.g., RRC connected state).

In one embodiment, the processor 405 determines the first subgroup by identifying one or more of remote UEs of the group which the target base unit cannot support due to mobility limitations of the identified one or more of remote UEs. In another embodiment, the processor 405 determines the first subgroup by determining (e.g., from a handover response from the target base unit) that resource limitations at the target base unit prevent supporting the one or more of the remote UEs associated with the relay UE.

Additionally, the processor 405 sends, to at least one remote UE in the first subgroup of remote UEs (e.g., controls the transceiver 425 to send), a command to resume communication with the mobile communication network without using the relay UE. Here, the processor 405 may control the transceiver 425 to send the command(s) to resume communication. Recall that the first subgroup includes one or more of remote UEs from among the group of remote UEs. Because the remote UEs have an indirect connection to the RAN (e.g., they are connected via the relay UE), the command to resume communication without using the relay UE is a command to switch from an indirect mode (e.g., communicating via the relay UE) to a direct mode (e.g., communicating directly with the RAN).

In certain embodiments, the processor 405 requests (e.g., controls the transceiver 425 to request) a measurement report from at least one remote UE in the first subgroup of remote UEs (e.g., in response to determining the first subgroup of remote UEs). Typically, the requested measurement report indicates which cells (e.g., base unit serving areas) the UE can detect and how strong the cells' transmission are. The measurement report may include additional information, such as channel conditions, UE-based parameters, and the like (as configured). The processor 405 uses the measurement reports to select a target base unit for the remote UEs in the first subgroup, such as the second target eNB 221. Note that the remote UEs' target base unit(s) is/are different base unit(s) than that selected for the relay UE, due to the relay UE's target base unit being unable to support the remote UE(s) in the first subgroup.

In certain embodiments, the processor 405 executes handover of the relay UE to the target base unit in parallel with receiving one or more measurement reports from the first subgroup of remote UEs. When handing over the relay UE, the processor 405 simultaneously hands over any remote UEs of the first group that are not included in the first subgroup to the target base unit (e.g., those remote UEs permitted to keep their indirect connection when the relay UE hands over). Again, handover of those remote UEs not in the first subgroup occurs in parallel with receiving one or more measurement reports from the first subgroup of remote UEs.

In some embodiments, the processor 405 sends the command to resume communication with the mobile communication network without using the relay UE in response to receiving measurement reports from a remote UE in the first subgroup of remote UEs and in response to determining a target base unit for the remote UE based on the received measurement reports. In certain embodiments, the processor 405 sends the command to resume communication without using the relay UE by sending an RRC message to at least one remote UE in the first subgroup of remote UEs. Here, the RRC message instructs a remote UE in the first subgroup to resume communication with the determined target base unit in the mobile communication network.

In some embodiments, determining the group of one or more remote UEs associated with the relay UE includes the processor 405 identifying one or more remote UEs that are in an RRC connected state and that have an RRC connection whose path includes the relay UE. In certain embodiments, the relay UE is a L2 relay for the group of one or more remote UEs. Here, the relay UE and each remote UE in the group of one or more remote UEs has its own RRC connection with the base station apparatus 400 and its own NAS connection with the mobile communication network.

Note that the base station apparatus 400 (in its role as source base unit) is aware that a connection is relayed (e.g., that a UE has a PC5 connection with a relay UE) only when the remote UE has an active RRC connection via the relay UE. When the processor 405 hands over the relay UE to the target base unit, any remote UE that is in an RRC Idle state (e.g., does not have an active RRC connection) is also handed over to the target base unit (e.g., to the first target eNB 220).

However, if a remote UE in an RRC Idle state cannot be supported by the target base unit, then when the remote UE sends an initial RRC message and the base unit determines is cannot support the remote UE (e.g., due to the remote UE being listed in a handover restriction list), the target base unit begins a handover procedure to handover the remote UE to a base unit that the remote UE can connect to, rather than rejecting the RRC connection. Generally, a base unit rejects an RRC connection if it cannot support the remote UE. However, in the disclosed embodiments, the remote UE handed over while in Idle mode is instead handed over to another base unit.

In some embodiments, the processor 405 receives from a remote UE (e.g., a member of the group of remote UEs) a request to switch to a second data path with the mobile communication network that does not include the relay UE. In response to the request to switch data paths, the processor 405 asks for a measurement report from the requesting remote UE. After receiving a measurement report from the remote UE, the processor 405 selects a second base unit to be part of the second data path and sends a command to the remote UE (via the first data path) to switch to the second data path. Here, the second data path includes the second base unit, but does not include the relay UE. Additionally, the processor 405 switches the remote UE from the first data path to the second data path without changing the data path of the relay UE.

In certain embodiments, the processor 405 receives, from the relay UE, a second request to switch the data path a second remote UE that is using the first data path. Here, the second request is also a request to switch to a data path with the mobile communication network that does not include the relay UE. In response to the request to switch data paths, the processor 405 asks for a measurement report from the second remote UE. In one embodiment, after receiving a measurement report from the second remote UE, the processor 405 sends a command to the second remote UE, via the first data path to switch to a third data path that includes a third base unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to enabling a remote UE to switch from indirect communication mode to direct communication mode while maintaining service continuity, for example storing measurement reports, UE mobility limitations, and the like. In certain embodiments, the memory 410 also stores program code and related data, such as an operating system or other controller algorithms operating on the base station apparatus 400 and one or more software applications.

The input device 415, in one embodiment, may include any known computer input device including a touch panel, a button, a keyboard, a stylus, a microphone, or the like. In some embodiments, the input device 415 may be integrated with the display 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The display 420, in one embodiment, may include any known electronically controllable display or display device. The display 420 may be designed to output visual, audible, and/or haptic signals. In some embodiments, the display 420 includes an electronic display capable of outputting visual data to a user. For example, the display 420 may include, but is not limited to, an LCD display, an LED display, an OLED display, a projector, or similar display device capable of outputting images, text, or the like to a user. As another, non-limiting, example, the display 420 may include a wearable display such as a smart watch, smart glasses, a heads-up display, or the like. Further, the display 420 may be a component of a smart phone, a personal digital assistant, a television, a table computer, a notebook (laptop) computer, a personal computer, a vehicle dashboard, or the like.

In certain embodiments, the display 420 includes one or more speakers for producing sound. For example, the display 420 may produce an audible alert or notification (e.g., a beep or chime). In some embodiments, the display 420 includes one or more haptic devices for producing vibrations, motion, or other haptic feedback. In some embodiments, all or portions of the display 420 may be integrated with the input device 415. For example, the input device 415 and display 420 may form a touchscreen or similar touch-sensitive display. In other embodiments, the display 420 may be located near the input device 415.

The transceiver 425 communicates with one or more UEs and with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with the remote unit 105, the relay unit 120, the mobile core network 130, the remote UE 205, the relay UE 210, the MME-remote 230, and the MME-relay 240.

Figure 5A:
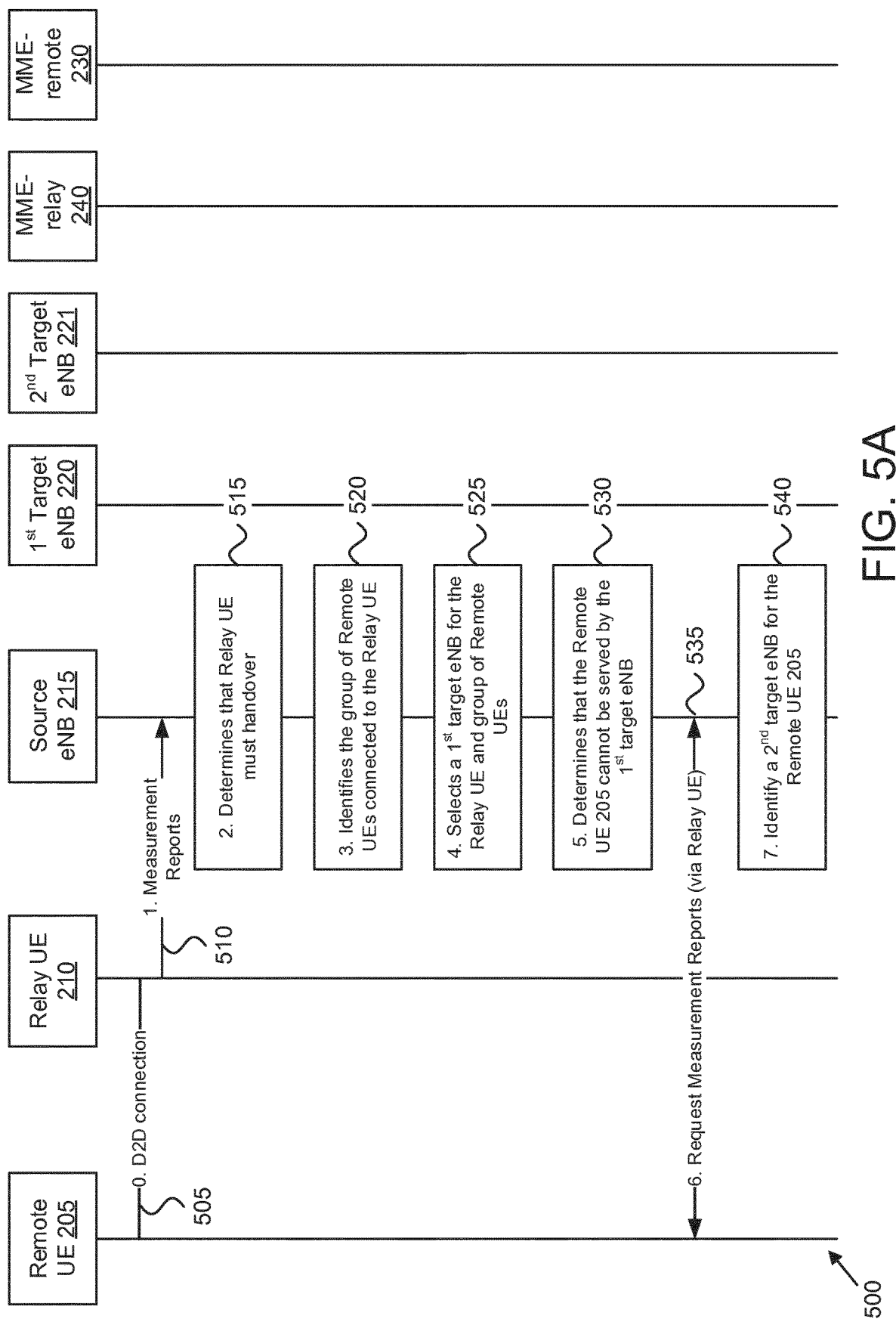
FIG. 5 is a block diagram illustrating one embodiment of a network procedure for enabling a remote UE to switch from indirect communication mode to direct communication mode while maintaining service continuity.
Figure 5B:
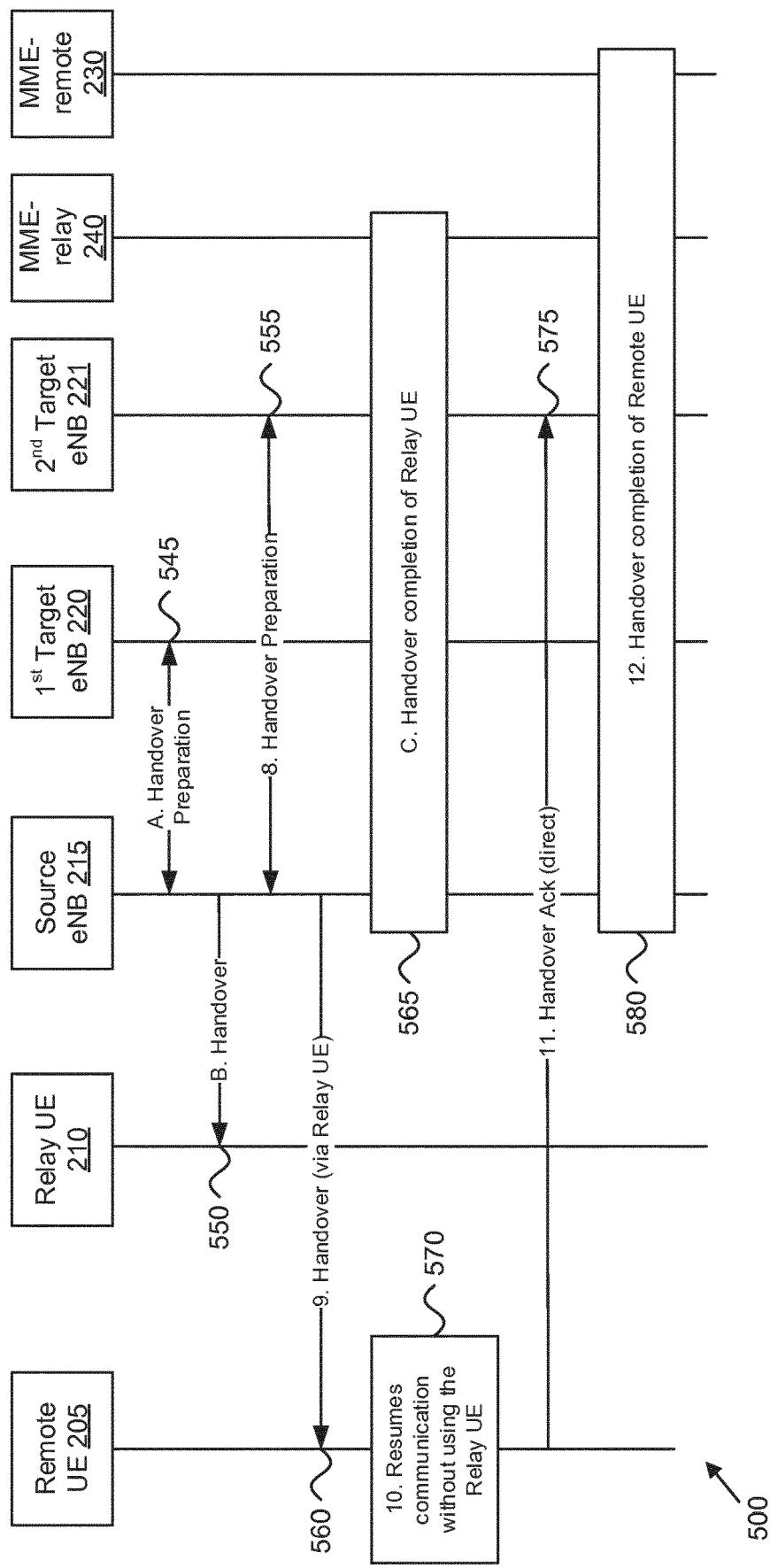

FIGS. 5A and 5B depict a network procedure 500 for enabling a remote UE to switch from indirect communication mode to direct communication mode while maintaining service continuity, according to embodiments of the disclosure. The network procedure 500 involves the remote UE 205, the relay UE 210, the source eNB 215, the first target eNB 220, the second target eNB 221, the MME-remote 230, and the MME-relay 240. The network procedure 500 is a network-initiated procedure for switching communication mode of the remote UE 205. The network procedure 500 addresses a scenario where the remote UE 205 using indirect mode of communication (via the relay UE 210) is instructed to switch to direct mode of communication (e.g., without using the relay UE 210) when the network cannot any longer support communication of this remote UE 205 via the said relay UE 210. For example, the relay UE 210 may be about to handover to an eNB (e.g., the first target eNB 220) which cannot support the remote UE 205.

The network procedure 500 begins at FIG. 5A with the remote UE 205 and relay UE 210 having established a D2D connection (see connection 505). For example, the D2D connection may be established using LTE-direct, WiFi-direct, or the like. While only one remote UE 205 is shown, more than one remote UEs can be using the same relay UE 210. The relay UE 210 is in a connected mode and sends measurement reports to the source eNB 215, or example using RRC signaling (see messaging 510). In certain embodiments, the measurement reports may be event-driven reporting, for example due to the signal strength a serving cell going below a first threshold and/or the signal strength of a neighbor cell exceeding a second threshold.

At some point, the source eNB 215 determines that the relay UE 210 must handover to another cell based on the measurement reports provided by the relay UE 210 (see block 515). Conventionally, a target cell is selected solely based on the relay UE 210. However, is the described embodiments, the source eNB 215 recognizes that one or more remote UEs (including the remote UE 205) are indirectly involved in the handover due to their using the relay UE 210. As such, the source eNB 215 identifies the group of remote UEs connected to the relay UE 210 (see block 520).

In certain embodiments, the source eNB 215 identifies each remote UE (including the remote UE 205) connected to the relay UE 210 and in a connected mode. Note that the remote UEs in connected mode do not send measurement reports to the source eNB 215 because they do not have direct radio communication with the source eNB 215. As noted above, the source eNB 215 selects a first target eNB, considering not only the relay UE 210 but also the identified remote UEs (see block 525). Here, the source eNB 215 selects the first target eNB 220 as the handover target. In other embodiments, the source eNB 215 may select another suitable target eNB in a mobile communication system. In some embodiments, the source eNB 215 is able to select a target eNB that can serve the relay UE 210 and all remote UEs connected to the relay UE.

However, in certain embodiments the selected target eNB (e.g., first target eNB 220) may be unable to support one or more remote UEs. In one example, the remote UE 205 may have mobility limitations, e.g., it is restricted by its subscription to operate only in a given area of the network. When the selected target eNB is outside this area, it cannot provide service to the remote UE 205. In this case, the source eNB 215 knows before the handover execution which remote UEs may have mobility limitations preventing the selected target eNB from supporting them.

In another example, the selected target eNB may be limited in resources and may not be able to provide the resources to support the communication requirements of all remote UEs. In this scenario, the selected target eNB will not be able to support all remote UEs; however, the source eNB 215 does not know before the handover execution which remote UEs can be supported in a selected target eNB. Rather, the source eNB 215 discovers that the selected target eNB will not be able to support all remote UEs when the selected target eNB responds to a handover request message.

In yet another example, the selected target eNB may not be upgraded to support communication with remote UEs via the relay UE 210. In this case, only the relay UE is able to be handed over while the handover of all remote UEs will fail.

In the depicted embodiments, it is not possible to select a target eNB that can support the relay UE 210 and all remote UEs. Here, the source eNB 215 identifies that the remote UE 205 (and possibly more remote UEs referred to as the subgroup of UEs) cannot be served by the first target eNB 220, e.g., because of mobility limitation and/or lack of available resources in the first target eNB 220 (see block 530). Because the first target eNB 220 cannot support a subgroup of the remote UEs (including the remote UE 205), the source eNB 215 determines how the unsupported remote UEs can stop using the relay UE 210 but still maintain their ongoing communications.

Here, the source eNB 215 decides to switch the remote UE 205 to a direct communication mode, e.g., to stop using the relay UE 210 and establish a direct radio connection with a eNB. In order to determine the best eNB to serve the remote UE 205, the source eNB 215 sends a request to the remote UE 205 to provide measurement reports (see messaging 535). Based on the measurement reports from the remote UE 205, the source eNB 215 identifies a second target eNB for the remote UE 205 (see block 540). Here, the source eNB 215 selects the second target eNB 221.

The network procedure 500 continues at FIG. 5B. After identifying the second target eNB 221 as the target for the remote UE 205, the source eNB 215 prepares to handover the remote UE 205 to the second target eNB 221. To do so, the source eNB 215 sends handover signaling to the second target eNB 221 (see messaging 555) and sends a handover command to the remote UE 205 (see messaging 560). Note that the handover command is sent via the relay UE 210, as the remote UE 205 has no direct connection to the source eNB 215.

In certain embodiments, this handover command is an RRC Reconfiguration Request which triggers the remote UE 205 to configure its transceiver for direct communication with the second target eNB 221. The remote UE 205 responds to the handover command by resuming communication with the mobile network without using the relay UE 210 (see block 570). In parallel, the source eNB 215 executes a second procedure for the relay UE 210 (and the supported remote UEs) by sending handover signaling to the first target eNB 220 (see messaging 545) and sending a handover command to the relay UE 210 (see messaging 550). Additionally, the source eNB 215 completes handover of the relay UE 210 (and the supported remote UEs) with the first target eNB 220 and the MME-relay 240 based on existing procedures.

Returning to the remote UE 205, the remote UE 205 sends a handover ack message directly to the target eNB after configuring its transceiver for direct communication with the second target eNB 221 (see messaging 575). At this point, the handover of the remote UE is completed with the second target eNB 221 and the MME-remote 230 based on existing procedures.

Figure 6:
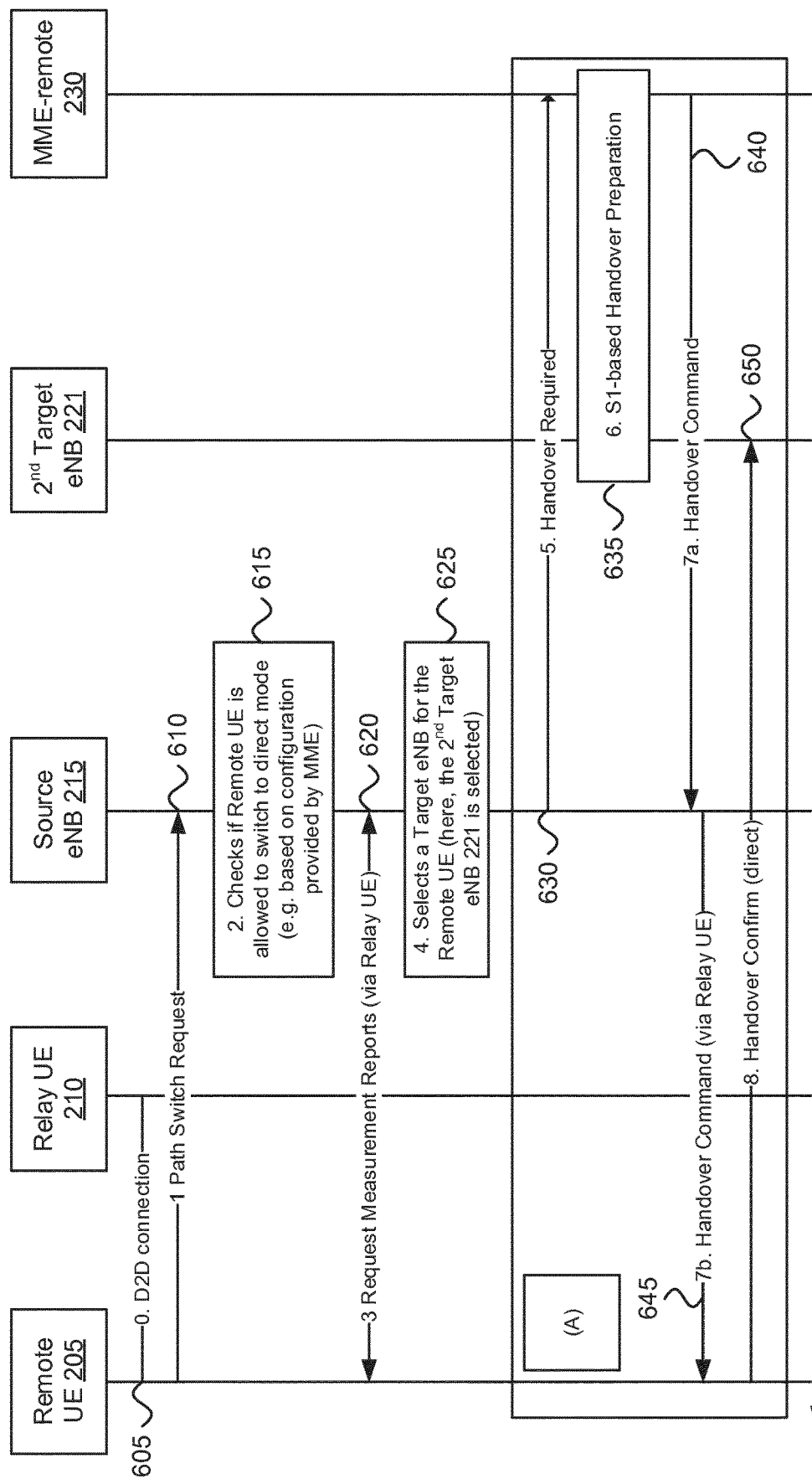
FIG. 6 is a block diagram illustrating one embodiment of a network procedure for switching a data path of a remote unit without changing the data path of a relay unit.

FIG. 6 depicts one network procedure 600 for switching a data path of a remote unit without changing the data path of a relay unit, according to embodiments of the disclosure. The network procedure 600 involves the remote UE 205, the relay UE 210, the source eNB 215, the second target eNB 221, and the MME-remote 230. The network procedure 600 is a UE initiated procedure for switching communication modes. FIG. 6 depicts switching the data path using an S1-based handover.

The network procedure 600 addresses a scenario where the decision to switch mode is taken by the remote UE 205 itself. For example, the remote UE 205 may decide to switch to direct mode in response to determining that direct communication with the mobile network is feasible while it was previously infeasible, e.g., due to the remote UE 205 being out of network coverage. In another example, the remote UE 205 may decide to switch to direct mode when the remote UE 205 is placed on a charging device, thus it does not need to communicate with a nearby relay UE 210 to reduce its power consumption. In yet another example, the remote UE 205 may decide to switch to direct mode when communication with the relay UE 210 deteriorates or after a user's request.

The network procedure 600 begins with the remote UE 205 and relay UE 210 having established a D2D connection (see connection 605). For example, the D2D connection may be established using LTE-direct, WiFi-direct, or the like. At some point in time, the remote UE 205 sends a request to the source eNB 215 to switch data paths (e.g., to switch to a direct mode, see messaging 610). In certain embodiments, the remote UE 205 makes the request via an RRC message.

In response, the source eNB 215 checks if path switching is allowed for the remote UE 205 (see block 615). In one embodiment, this decision is based on configuration information provided from the MME-remote 230 and/or local configuration at the source eNB 215. Here, the source eNB 215 determines that the remote UE 205 is permitted to switch data paths and requests measurement reports from the remote UE 205 (see messaging 620). Note that the remote UE 205 still has an indirect connection to the mobile network; thus, the measurement report request and response are send via the relay UE 210.

Based on received measurement reports, the source eNB 215 selects a target eNB for the remote UE 205 (see block 625). Here, the source eNB 215 selects the second target eNB 221 for establishing the new data path. The source eNB can now initiate (A) an S1-based handover, depicted in FIG. 6, or (B) inform the remote UE 205 to switch cell, depicted in FIG. 7.

To switch data paths using the S1-based handover, the source eNB 215 sends a Handover Required message to the MME-remote 230 serving the remote UE 205 (see messaging 630). In certain embodiments, the Handover Required message indicates that the remote UE 205 requested to switch from indirect to direct mode. The MME-remote 230 then determines whether the path switch is allowed.

In response to the MME-remote 230 allowing the path switch, the MME-remote 230 and second target eNB 221 initiate S1-based handover preparation for handing over the remote UE 205 to the second target eNB 221 (see block 635). In response to the S1-based handover preparation, when the bearers are allocated for the remote UE 205, the MME-remote 230 sends a Handover Command message to the remote UE 205 via the source eNB 215 and relay UE 210 (see messaging 640, 645). Responsive to the Handover Command message, the remote UE 205 sends a Handover Confirm message to the second target eNB 221 (without using the relay UE 210) confirming that the handover was successful (see messaging 650) and the network procedure 600 is complete. Note that the Handover Command message is received via the relay UE 210, but that the remote UE 205 switches to direct communication with the second target eNB 221 in response to the Handover Command message.

Figure 7:
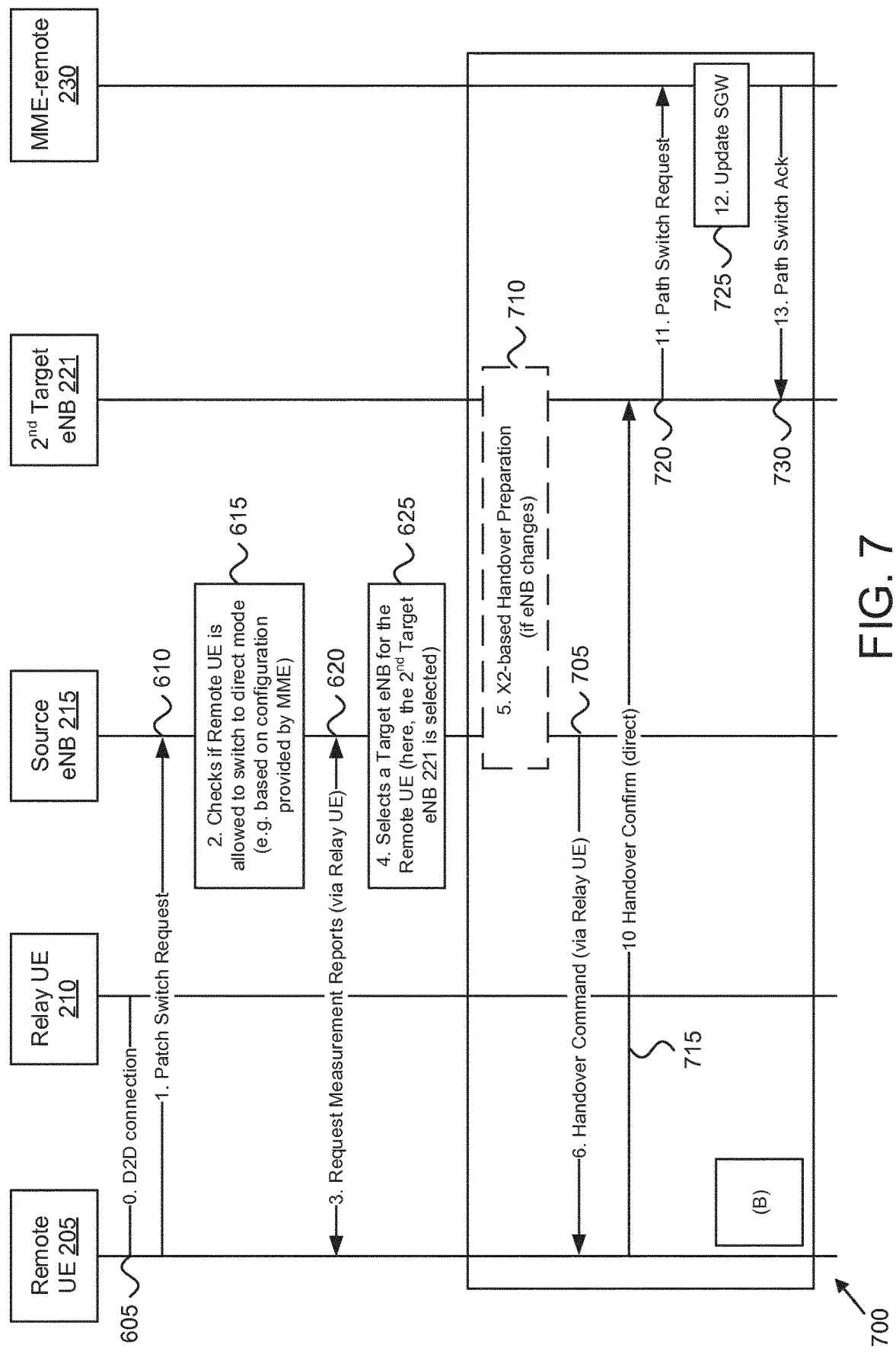
FIG. 7 is a block diagram illustrating another embodiment of a network procedure for switching a data path of a remote unit without changing the data path of a relay unit.

FIG. 7 depicts one network procedure 700 for switching a data path of a remote unit without changing the data path of a relay unit, according to embodiments of the disclosure. The network procedure 700 involves the remote UE 205, the relay UE 210, the source eNB 215, the second target eNB 221, and the MME-remote 230. The network procedure 700 is also a UE initiated procedure for switching communication modes. Similar to the network procedure 600, the network procedure 700 also addresses a scenario where the decision to switch mode is taken by the remote UE 205 itself. FIG. 7 depicts switching the data path using an X2-based handover.

The network procedure 700 begins with the remote UE 205 and relay UE 210 having established a D2D connection (see connection 605). For example, the D2D connection may be established using LTE-direct, WiFi-direct, or the like. At some point in time, the remote UE 205 sends a request to the source eNB 215 to switch data paths (e.g., to switch to a direct mode, see messaging 610). In certain embodiments, the remote UE 205 makes the request via an RRC message.

In response, the source eNB 215 checks if path switching is allowed for the remote UE 205 (see block 615). In one embodiment, this decision is based on configuration information provided from the MME-remote 230 and/or local configuration at the source eNB 215. Here, the source eNB 215 determines that the remote UE 205 is permitted to switch data paths and requests measurement reports from the remote UE 205 (see messaging 620). Note that the remote UE 205 still has an indirect connection to the mobile network; thus, the measurement report request and response are send via the relay UE 210.

Based on received measurement reports, the source eNB 215 selects a target eNB for the remote UE 205 (see block 625). Here, the source eNB 215 selects the second target eNB 221 for establishing the new data path. In the network procedure 700, the source eNB 215 determines to instruct the remote UE 205 to switch cells directly.

Where handover to another eNB is required (due to a change in eNB), the source eNB 215 initiates X2-based handover preparation with the selected target eNB (see block 705). In the depicted embodiment, the second target eNB 221 is selected as the target cell for the remote UE 205, thus requiring X2-based handover preparation. Additionally, the source eNB 215 sends a Handover Command message to the remote UE 205 with a notification to handover to the selected target eNB (see messaging 710). Note that the Handover Command message is sent via the relay UE 210.

If the source eNB 215 is the selected target eNB, then the remote UE 205 hands over from the relay UE 210 to the source eNB 215. In this case, the remote UE 205 receives configuration parameters to synchronize with the source eNB 215. Additionally, the MME serving the remote UE 205 (e.g., MME-remote 230) is notified that the remote UE 2015 is no longer accessing the network indirectly (e.g., no longer accessing the network via the relay UE 210). As an optimization, if the source eNB 210 determines that it is the best eNB to serve the remote UE 205, then the Handover Command message may be an RRC Connection Reconfiguration message sent from the source eNB 215 that includes an indication for the remote UE 205 to switch from an indirect network connection to a direct connection without invoking X2-based or S1-based handover.

Responsive to the Handover Command message, the remote UE 205 sends a Handover Confirm message to the second target eNB 221 (without using the relay UE 210) confirming that the handover was successful (see messaging 715). Note that the Handover Command message is received via the relay UE 210, but that the remote UE 205 switches to direct communication with the second target eNB 221 in response to the Handover Command message. Next, the second target eNB 221 notifies the MME-remote 230 by sending a Path Switch Request message over S1-AP (see messaging 720). In response to the Path Switch Request message, the MME-remote 230 updates the affected S-GW with the new eNB (e.g., the second target eNB 221) for the remote UE 205 (see block 725). The MME-remote 230 then sends a Path Switch Ack message to the second target eNB 221 (see messaging 730) and the network procedure 700 is complete. Note that where the Handover Command message may be an RRC Connection Reconfiguration message that instructs the remote UE 205 to switch cells, the Handover Confirm message may be an RRC Connection Reconfiguration message confirming that the cell switch was successful.

Figure 8:
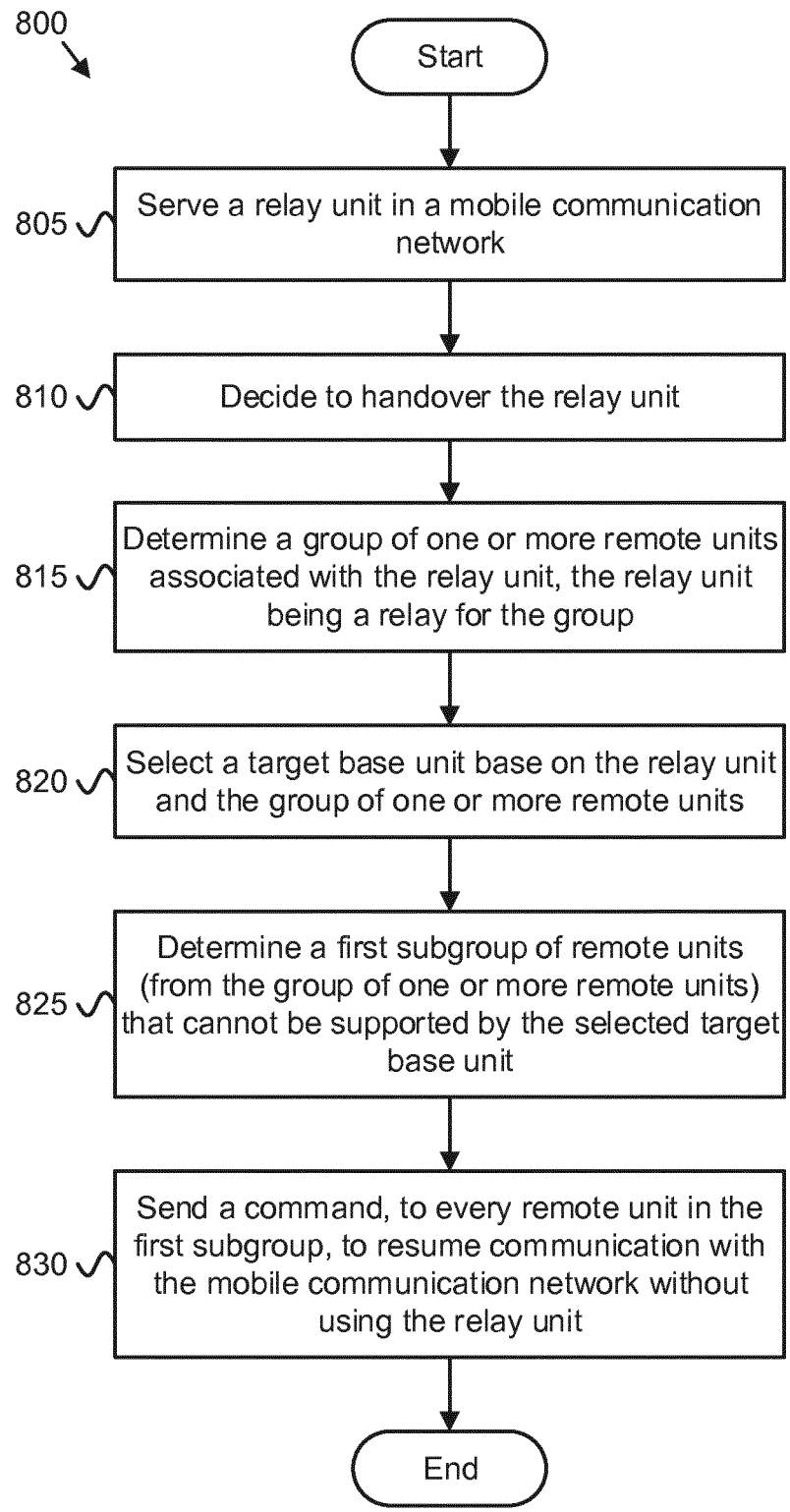
FIG. 8 is a schematic flow chart diagram illustrating one embodiment of a method for enabling a remote UE to switch from indirect communication mode to direct communication mode while maintaining service continuity.

FIG. 8 depicts a method 800 for enabling a remote UE to switch from indirect communication mode to direct communication mode while maintaining service continuity, according to embodiments of the disclosure. In some embodiments, the method 800 is performed by an apparatus, such as the base unit 110, the source eNB 215, and/or base station apparatus 400. In certain embodiments, the method 800 may be performed by a processor executing program code, for example, a microcontroller, a microprocessor, a CPU, a GPU, an auxiliary processing unit, a FPGA, or the like.

The method 800 begins and serves 805 a relay unit in a mobile communication network. Here, the relay unit may be the relay unit 120 and/or the relay UE 210. Serving 805 the relay unit may include serving one or more remote units accessing the mobile communications network via the relay unit. In some embodiments, the relay unit is a L2 relay, such that the relay unit and each remote unit in the group of one or more remote units has its own RRC connection and its own NAS connection with the mobile communication network.

The method 800 includes deciding 810 to hand over the relay unit. The method 800 includes determining 815 a group of one or more remote units associated with the relay unit, wherein the relay unit is a relay for the group. In certain embodiments, determining 815 the group of one or more remote units associated with the relay unit includes identifying one or more remote units that are in an RRC connected state and that have an RRC connection whose path includes the relay unit.

The method 800 includes selecting 820 a target base unit of a mobile communication network based on the relay unit and the group of one or more remote units. In some embodiments, selecting 820 the target base unit based on the relay unit and the group of one or more remote units includes identifying a number of remote units a base unit can support and selecting a base unit supporting the largest number of remote units as the target base unit.

The method 800 includes determining 825 a first subgroup of remote units from among the group of one or more remote units that cannot be supported by the target base unit. In one embodiment, determining 825 the first subgroup of remote units that cannot be supported by the target base unit includes identifying one or more of remote units of the group which the target base unit cannot support due to mobility limitations of the identified one or more of remote units. In another embodiment, determining 825 the first subgroup of remote units that cannot be supported by the target base unit includes determining from a handover response from the target base unit that resource limitations at the target base unit prevent supporting the group of one or more remote units associated with the relay unit.

The method 800 includes sending 830 a command, to a remote unit in the first subgroup of remote units, to resume communication with the mobile communication network without using the relay unit. In some embodiments, sending 830 the command to resume communication with the mobile communication network without using the relay unit includes sending an RRC message to at least one remote unit in the first subgroup of remote units. Here, the RRC message instructs a remote unit in the first subgroup of remote units to transition to resume communication with a target base unit in the mobile communication network.

In certain embodiments, sending 830 the command to resume communication includes requesting measurement reports from at least one remote unit in the first subgroup of remote units in response to determining 825 the first subgroup. In such embodiments, sending 830 a command to resume communication with the mobile communication network without using the relay unit occurs in response to receiving the measurement reports from a remote unit in the first subgroup of remote units and in response to determining a target base unit for the remote unit based on the received measurement reports. In one embodiment, sending 830 the command to resume communication includes completing handover of the relay unit and of the remote units not included in the first subgroup to the target base unit in parallel with receiving one or more measurement reports from the first subgroup of remote units. The method 800 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a radio transceiver that communicates with a relay unit;
a processor that:
decides to handover the relay unit;
determines a group of remote units associated with the relay unit, wherein each remote unit in the group has a Layer 2 device-to-device ("D2D") connection with the relay unit and exchanges Radio Resource Control ("RRC") and Non-Access Stratum ("NAS") signaling with a mobile communication network via the Layer 2 D2D connection with the relay unit;
selects a target base unit of the mobile communication network based on the relay unit and the group of remote units, wherein the target base unit supports handover of the relay unit;
determines a first subgroup of remote units from among the group of remote units that cannot be supported by the target base unit, wherein the target base unit supports handover of a second subgroup of the remote units, the second subgroup comprising a remainder of the group of remote units associated with the relay unit; and
sends, to a remote unit in the first subgroup of remote units, a command to resume communication with the mobile communication network by switching its communication mode from a mode using the Layer 2 D2D connection with a relay unit to a communication mode using an Uu interface with the mobile communication network, wherein the remote unit exchanges RRC and NAS signaling directly with the mobile communication network without using the relay unit.

2. The apparatus of claim 1, wherein the processor further:
requests a measurement report from one or more remote units in the first subgroup of remote units; and
executes handover of the relay unit and of the remote units not included in the first subgroup to the target base unit in parallel with receiving one or more measurement reports from the first subgroup of remote units.

3. The apparatus of claim 1, wherein determining the group of one or more remote units associated with the relay unit comprises the processor identifying one or more remote units that are in a radio resource control ("RRC") connected state and that have an RRC connection whose path includes the relay unit.

4. The apparatus of claim 1, wherein selecting the target base unit based on the relay unit and the group of one or more remote units comprises the processor identifying a number of remote units a base unit can support and selecting a base unit supporting the largest number of remote units as the target base unit.

5. The apparatus of claim 1, wherein the relay unit is a layer 2 ("L2") relay, wherein the relay unit and each remote unit in the group of one or more remote units has its own radio resource control ("RRC") connection with the apparatus and its own non-access stratum ("NAS") connection with the mobile communication network.

6. The apparatus of claim 1, wherein determining the first subgroup of remote units that cannot be supported by the target base unit for communicating with the mobile network via the relay unit comprises the processor identifying one or more of remote units of the group which the target base unit cannot support due to mobility limitations of the identified one or more of remote units.

7. The apparatus of claim 1, wherein determining the first subgroup of remote units that cannot be supported by the target base unit comprises the processor determining from a handover response from the target base unit that resource limitations at the target base unit prevent supporting the group of one or more remote units associated with the relay unit.

8. The apparatus of claim 1, wherein sending the command to resume communication with the mobile communication network without using the relay unit comprises the processor sending a radio resource control ("RRC") message to each remote unit in the first subgroup of remote units via the relay unit, the RRC message instructing a remote unit in the first subgroup to resume communication with a target base unit in the mobile communication network.

9. The apparatus of claim 1, wherein the processor further requests measurement reports from each remote unit in the first subgroup of remote units in response to determining the first subgroup of remote units, wherein the processor sends the command to resume communication with the mobile communication network without using the relay unit in response to receiving measurement reports from each remote unit in the first subgroup of remote units and in response to determining a target base unit for each remote unit based on the received measurement reports.

10. The apparatus of claim 1, wherein the processor further:
receives a radio resource control ("RRC") initial message from a second remote unit via the relay unit;
determines that the second remote unit is restricted from using the apparatus; and
sends to the second remote unit a command to resume communication with the mobile communication network by using a second base unit and without using the relay unit.

11. A method comprising:
serving a relay unit in a mobile communication network;
deciding to handover the relay unit;
determining a group of remote units associated with the relay unit, wherein each remote unit in the group has a Layer 2 device-to-device ("D2D") connection with the relay unit and exchanges Radio Resource Control ("RRC") and Non-Access Stratum ("NAS") signaling with a mobile communication network via the Layer 2 D2D connection with the relay unit;
selecting a target base unit of the mobile communication network based on the relay unit and the group of remote units, wherein the target base unit supports handover of the relay unit;
determining a first subgroup of remote units from among the group of remote units that cannot be supported by the target base unit, wherein the target base unit supports handover of a second subgroup of the remote units, the second subgroup comprising a remainder of the group of remote units associated with the relay unit; and
sending, to a remote unit in the first subgroup of remote units, a command to resume communication with the mobile communication network by switching its communication mode from a mode using the Layer 2 D2D connection with a relay unit to a communication mode using an Uu interface with the mobile communication network, wherein the remote unit exchanges RRC and NAS signaling directly with the mobile communication network without using the relay unit.

12. The method of claim 11, further comprising:
requesting a measurement report from a remote unit in the first subgroup of remote units; and
completing handover of the relay unit and of the remote units not included in the first subgroup to the target base unit in parallel with receiving one or more measurement reports from the first subgroup of remote units.

13. The method of claim 11, wherein determining the group of one or more remote units associated with the relay unit comprises identifying one or more remote units that are in a radio resource control ("RRC") connected state and that have an RRC connection whose path includes the relay unit.

14. The method of claim 11, wherein selecting the target base unit based on the relay unit and the group of one or more remote units comprises identifying a number of remote units a base unit can support and selecting a base unit supporting the largest number of remote units as the target base unit.

15. The method of claim 11, wherein the relay unit is a layer 2 ("L2") relay, wherein the relay unit and each remote unit in the group of one or more remote units has its own radio resource control ("RRC") connection and its own non-access stratum ("NAS") connection with the mobile communication network.

16. The method of claim 11, wherein determining the first subgroup of remote units that cannot be supported by the target base unit for communicating with the mobile communication network via the relay unit comprises identifying one or more of remote units of the group which the target base unit cannot support due to mobility limitations of the identified one or more of remote units.

17. The method of claim 11, wherein determining the first subgroup of remote units that cannot be supported by the target base unit comprises determining from a handover response from the target base unit that resource limitations at the target base unit prevent supporting the group of one or more remote units associated with the relay unit.

18. The method of claim 11, wherein sending the command to resume communication with the mobile communication network without using the relay unit comprises sending a radio resource control ("RRC") message to each remote unit in the first subgroup of remote units via the relay unit, the RRC message instructing a remote unit in the first subgroup of remote units to transition to resume communication with a target base unit in the mobile communication network.

19. The method of claim 11, further comprising requesting measurement reports from each remote unit in the first subgroup of remote units in response to determining the first subgroup of remote units, wherein sending the command to resume communication with the mobile communication network without using the relay unit occurs in response to receiving measurement reports from each remote unit in the first subgroup of remote units and in response to determining a target base unit for each remote unit based on the received measurement reports.

20. The method of claim 11, further comprising:
  receiving, at a base unit, a radio resource control ("RRC") initial message from a second remote unit via the relay unit;
  determining that the second remote unit is restricted from using the base unit; and
  sending to the second remote unit a command to resume communication with the mobile communication network by using a second base unit and without using the relay unit.

\* \* \* \* \*